Sept. 6, 1966
H. A. MAHONY
3,271,015
PROCESS OF PREPARING LIME AND A SYSTEM INCLUDING
MEANS FOR PROVIDING A HOT GAS FOR
USE IN THE PROCESS
Filed Jan. 25, 1963
4 Sheets-Sheet 1
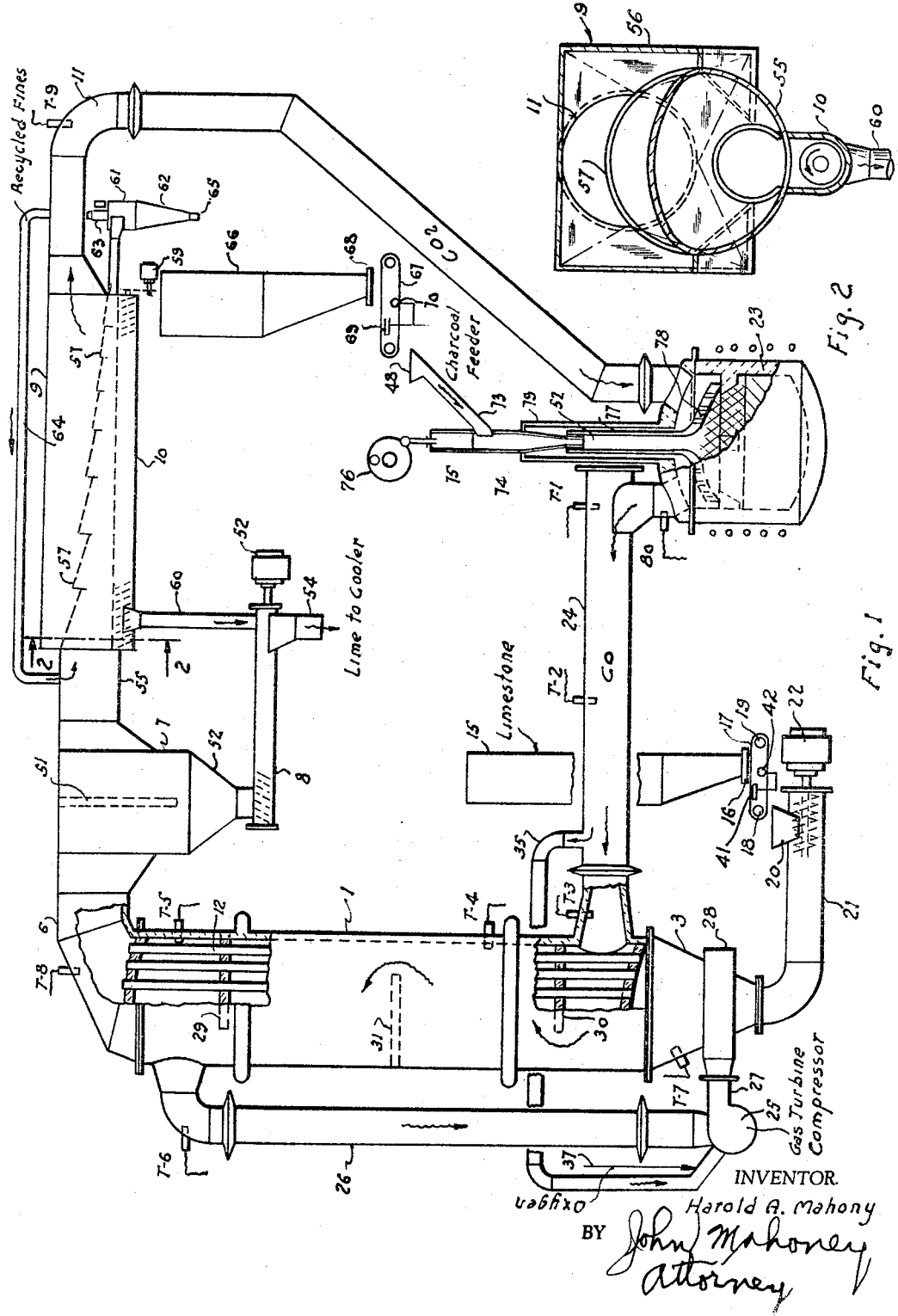
INVENTOR.
Harold A. Mahony
BY John Mahoney
Attorney Sept. 6, 1966  H. A. MAHONY  3,271,015
PROCESS OF PREPARING LIME AND A SYSTEM INCLUDING
MEANS FOR PROVIDING A HOT GAS FOR
USE IN THE PROCESS
Filed Jan. 25, 1963  4 Sheets-Sheet 2
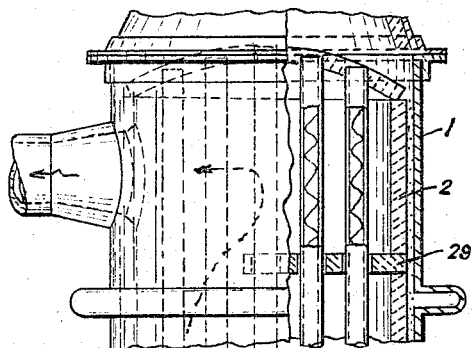
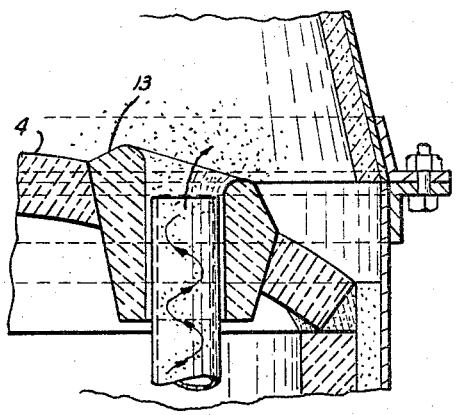
Fig. 4
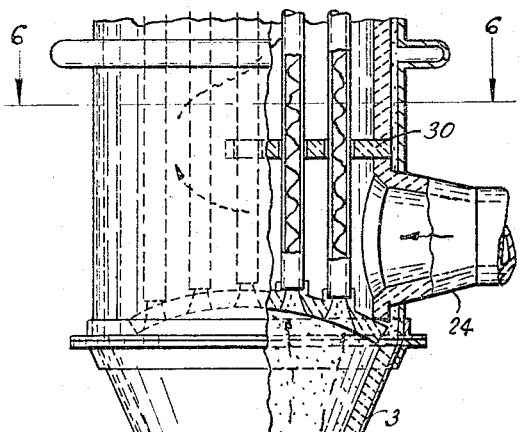
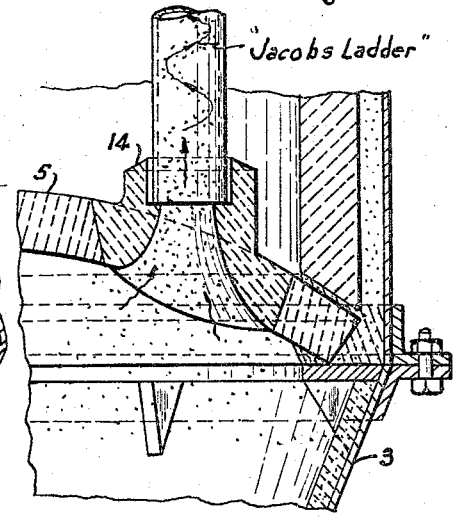
Fig. 5
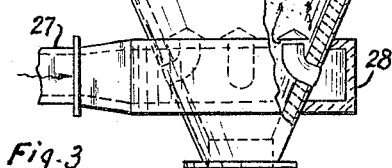
Fig. 3
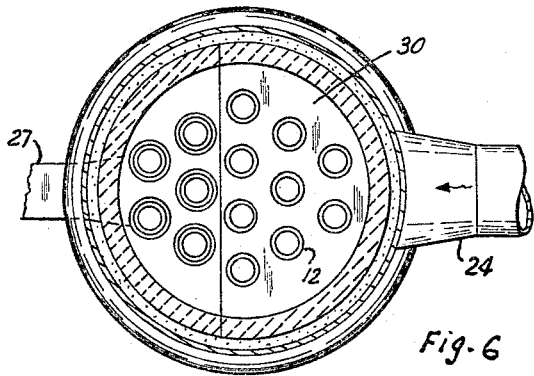
Fig. 6
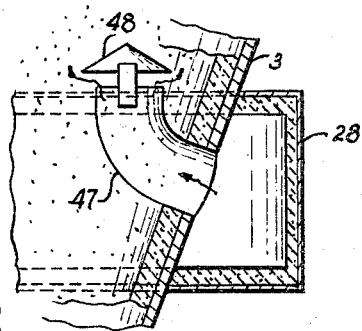
Fig. 7
INVENTOR
Harold A. Mahony
BY John Mahoney
Attorney Sept. 6, 1966 H. A. MAHONY 3,271,015
PROCESS OF PREPARING LIME AND A SYSTEM INCLUDING
MEANS FOR PROVIDING A HOT GAS FOR
USE IN THE PROCESS
Filed Jan. 25, 1963 4 Sheets-Sheet 3
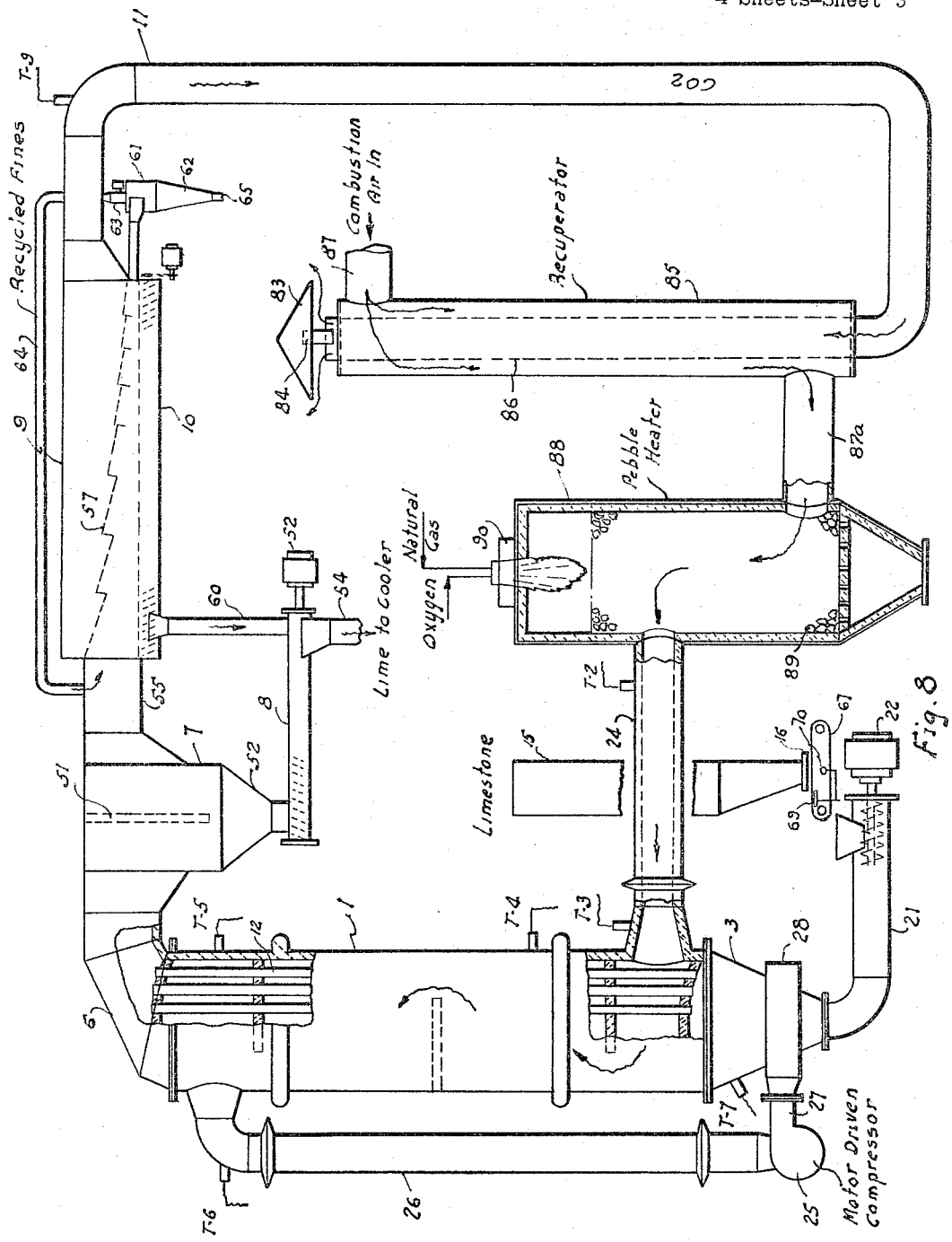
INVENTOR.
Harold A. Mahony
BY John Mahony
attorney

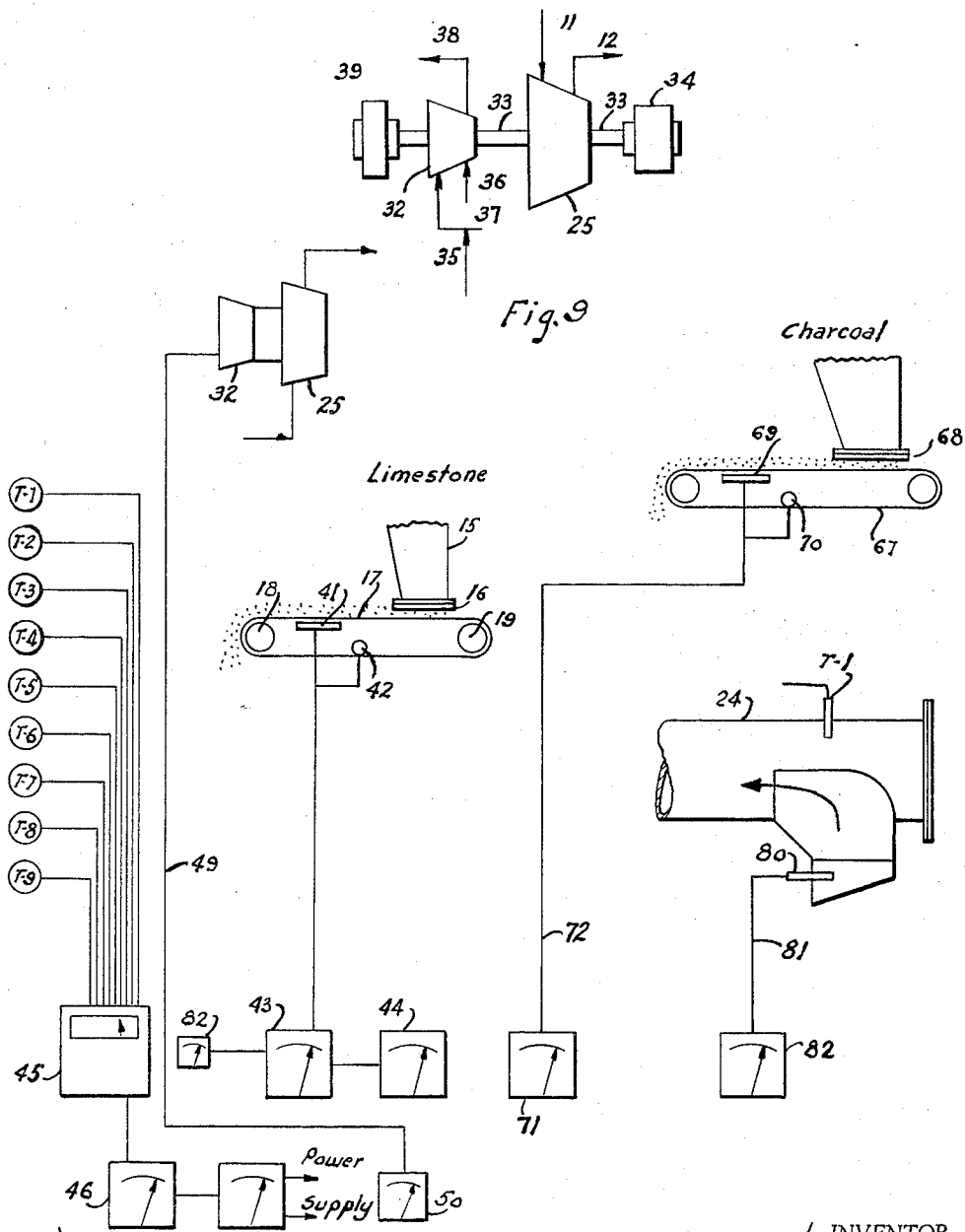

United States Patent Office 3,271,015
Patented Sept. 6, 1966

3,271,015
PROCESS OF PREPARING LIME AND A SYSTEM INCLUDING MEANS FOR PROVIDING A HOT GAS FOR USE IN THE PROCESS
Harold A. Mahony, 1827 Taylor Road, East Cleveland 12, Ohio
Filed Jan. 25, 1963, Ser. No. 253,874
11 Claims. (Cl. 263—1)

The present invention relates to a process of preparing lime including control means therefor and to an improved system in which a hot gas is provided for use in the process.

The use of oxygen in the various processes of refining steel has accelerated the chemical reactions involved to a great extent and although lumps of limestone having a diameter of approximately three inches are permissible in blast furnaces, they have no place in modern oxygen steel refining processes in which the charge must be in a state to be quickly assimilated by either the molten slag or molten metal bath.

It is therefore an object of the present invention to provide an improved process of treating limestone in a finely divided state in a kiln or reactor while heating the limestone with a gas, such as a reducing gas consisting predominantly of carbon monoxide while the gas is at a sufficiently high temperature to decompose at least a predominant amount of the limestone into lime and carbon dioxide but which is at an insufficient temperature to sinter a substantial amount of the lime.

Another object of my invention is to provide an improved process of preparing lime from finely divided limestone including the step of forcing the limestone upwardly through the tubes of a tubular kiln or reactor in a step by step fashion by means of a gas heated to such temperature that it will decomposed at least a predominant amount of the limestone into lime and carbon dioxide but at a temperature which is insufficient to sinter a substantial amount of the lime while simultaneously applying a comparatively high temperature to the exterior surfaces of the tubes.

A further object of my invention is to provide an improved process of preparing lime from finely divided limestone which includes the steps of forcing the finely divided limestone upwardly through the tubes of a tubular kiln or reactor by means of gas heated to such temperature that it will decompose the limestone into lime and carbon dioxide and at such pressure that the charge as it ascends upwardly through the tubes takes on a gurgitating action in which it passes from one side to the other and ascends at an angle of approximately 45° to a horizontal plane through each of the tubes.

Another object of my invention is to provide an improved system for preparing lime in a finely divided state including means for forcing limestone through the tubes of a tubular kiln or reactor by means of carbon monoxide to convert the limestone into lime and carbon dioxide and then reconverting the carbon dioxide into carbon monoxide for reuse in the process.

Another object of my invention is to provide an improved process of preparing finely divided lime in a tubular kiln or reactor with a reducing gas consisting predominantly of carbon monoxide which is at a sufficient temperature to decompose the limestone into lime and carbon dioxide but at an insufficient temperature to sinter the lime, and then reconverting the carbon dioxide into carbon monoxide and reutilizing it in the process.

My invention will be better understood by reference to the accompanying drawings in which:

FIG. 1 is an elevational view with parts broken away and parts in section of a system for preparing lime in a finely divided state from limestone and reconverting the carbon dioxide that is formed to carbon monoxide for reuse in the process.

FIG. 2 is a cross sectional view taken on a plane passing through the line 2—2 of FIG. 1, looking in the direction of the arrows;

FIG. 3 is a central cross sectional view of the kiln or reactor shown in FIG. 1 with parts in elevation and showing inserts arranged in the upper and lower headers in the kiln having openings therein for loosely receiving the upper and lower ends of a plurality of tubes;

FIG. 4 is an enlarged detail view of the upper header showing the upper portion of a tube extending loosely into the opening in one of the inserts in the upper header;

FIG. 5 is an enlarged detail view of the lower header showing an insert therein for loosely receiving and supporting the lower end of one of the tubes;

FIG. 6 is a cross sectional view taken on a plane passing through the line 6—6 of FIG. 3;

FIG. 7 is an enlarged detail view in section of a portion of the lower housing of the kiln encircled by the windbox and showing a tuyere extending from the windbox into the lower housing of the kiln;

FIG. 8 is a modification of my improved system, showing another method of providing hot gases for heating the lime and forcing it upwardly through the tubes of the kiln or reactor;

FIG. 9 is a diagrammatical view showing the turbine and blower used in my improved process; and FIG. 10 is a diagrammatical view illustrating the control means for the systems.

In accordance with my invention, a tubular kiln or reactor 1 is provided consisting of a refractory lined upper portion 2, a refractory lined lower housing 3, a refractory upper and a refractory lower header 4 and 5, respectively, a conduit means 6 leading from the upper end of the kiln, a primary separator 7, a screw conveyor 8 leading from the lower portion of the primary separator, a secondary separator 9, a screw conveyor 10 leading from the secondary separator, and a conduit means 11 for the exit of the gas.

The upper portion of the kiln or reactor includes a plurality of vertical tubes 12, the upper end of each of which tubes extends loosely through an opening in an insert 13 in the upper header and the lower end portion of each of which extends loosely into an opening and is supported by a shoulder in an insert 14 in the lower header 5. The tubes of the kiln or reactor have a smooth bore and while the size of the tubes may vary depending upon the size of the kiln or reactor, tubes having a diameter of approximately 4 to 6 inches have proven satisfactory. The tubes are formed of a metal or alloy which is capable of resisting the temperature to which they are subjected in the process, such as at a temperature of at least 1850° F. Alloys suitable for resisting such temperatures are disclosed in various publications, such as brochure T-313 entitled "Supertherm" published by the Electro-Alloys Division of American Brake Shoe Company, Elyria, Ohio, and the advertisement of Duraloy Company on page 85 of Industrial Heating for January 1962. The openings in the inserts in the upper and lower headers are sufficiently large, as shown, to permit the tubes to expand during the process.

The limestone which is utilized in the process must be in a finely divided state, such as minus 200 mesh or finer. A satisfactory charge may consist of approximately 20% minus 100 mesh, 30% plus 200 mesh, and 50% minus 325 mesh. In accordance with my invention, means are provided for forcing the limestone in its finely divided state into housing 3. For this purpose, a container 15 is provided having a lower reduced portion which is closed by gate 16 disposed over a belt 17. Belt 17 is driven by suitable means, such as a motor, and is trained around a pair of spaced pulleys 18 and 19 to cause the limestone to pass into a hopper 20 which is arranged below one end of the belt and which leads into a screw conveyor 21 by means of which the limestone is forced under pressure into the housing 3 of the kiln. As shown, the screw conveyor 21 is driven by suitable means, such as a motorized drive 22.

According to my invention, a gas is provided for forcing the finely divided limestone upwardly through the tubes of the kiln which is at a sufficiently high temperature to convert the limestone into lime and carbon dioxide and while any suitable gas may be utilized, such as carbon monoxide, or a mixture of carbon monoxide and carbon dioxide, I preferably utilize a reducing gas, such as carbon monoxide, and this is particularly true when a closed system is provided because if air is utilized in such a system, a large amount of nitrogen must be continuously heated and conveyed through the system.

As illustrated in FIG. 1, a closed system is provided including a hearth or furnace 23 in which a gas consisting principally of carbon monoxide is generated and which is conveyed to the bottom portion of the upper housing of kiln or reactor 1 through conduit means 24 at a temperature of approximately 2700° to 2900° F. and means are provided to draw the gas through the kiln or reactor in contact with the outer surfaces of the tubes and then blow it inwardly into the lower housing 3 to force the charge of finely divided limestone upwardly through the tubes of the kiln. For this purpose, a blower 25 is provided, the inlet to which is connected to a conduit means 26 leading from the upper portion of the kiln or reactor and the outlet to which is connected to a conduit means 27 leading to a windbox 28 surrounding the lower housing 3 and to assure uniform and efficient heating of the tubes, means are provided to cause a circuitous movement of the hot gas around the tubes during its passage through the kiln. For this purpose, a plurality of baffles are provided which are arranged in staggered relation, the upper and lower baffles 29 and 31 extending inwardly from one portion of the wall of the kiln and the central baffle 30 extending in the opposite direction from another portion of the wall.

The blower 25 may be driven by any suitable means, such as a gas turbine 32. As shown diagrammatically in FIG. 9, the shaft 33 of the turbine is provided with a motor drive to start the turbine after which the turbine is driven by a fuel consisting principally of carbon monoxide which is diverted from the main stream through conduit means 35 and which is mixed with air passing through a conduit means 36 and preferably oxygen which is passed into the turbine through lance 37. The products of combustion pass from the turbine through conduit means 38. As shown in FIG. 9, the turbine is connected to a generator 39 for energizing the electrical motors used in the system.

In converting the limestone into lime and carbon dioxide, the temperature of the hot gas used in the process must be carefully controlled. The pressure at which the limestone is forced upwardly through the tubes must also be carefully controlled and is dependent upon the specific gravity and amount of limestone which is present in the housing 3. In my improved process, it is desirable to maintain the housing 3 full or substantially full of limestone but not to compress it to any considerable extent and while the amount of limestone that is conveyed to housing 3 may be controlled by manual means, as shown in FIGS. 1 and 10, a scale 41 is arranged below the upper portion of belt 17 and a tachometer 42 engages the belt and for controlling the amount of limestone that flows into chute 20, an electrical impulse travels to a recording controller 43 and limestone recording controller 44. The limestone controller may be set as the system requires but as a rule when gate 16 is open the limestone flows freely on to belt 17 and the amount which flows into hopper 20 is controlled by the speed of the belt.

The temperature of the gas and particularly of the gas which forces the limestone upwardly through the tubes must be carefully controlled and will of course be at a temperature considerably less than the temperature of the gas that flows through the kiln or reactor. The temperature at which limestone is calcined into lime and carbon dioxide is 1832° F. and it is therefore essential that the exterior of the tubes be heated and the gas which forces the limestone upwardly through the tubes must be such that the temperature of the limestone as it is forced upwardly through the tubes shall not vary substantially below or above its calcining temperature. For instance, if the temperature of the limestone falls substantially below 1832° F., such as below 1822° F., some of the limestone will not be calcined whereas if the temperature of the limestone is raised substantially above 1832° F., such as approximately 1850° F., some of the lime will sinter and will be less satisfactory for use in metallurgical process than finely divided lime. As previously stated, to obtain satisfactory results, it is also desirable that the limestone be in a finely divided state.

To control the temperature of the gas throughout the system, a thermocouple T-1 is arranged at the junction of the outlet of furnace or hearth 23 and conduit means 24, a thermocouple T-2 is arranged in conduit means 24, a thermocouple T-3 is arranged at the inlet of conduit means 24 and the kiln 1, a thermocouple T-4 is arranged between baffles 29 and 30, a thermocouple T-5 is arranged above baffle 29, a thermocouple T-6 is arranged in the outlet 26 of conduit means 2 extending from the upper portion of the kiln or reactor, a thermocouple T-7 is arranged in housing 3, thermocouple T-8 is arranged in outlet conduit means 6, and a thermocouple T-9 is arranged at the outlet of conduit means 11. As shown in FIG. 10, the thermocouples are connected to control means 45 and 46 which regulate the amount of electrical energy applied to hearth or furnace 23. If desired, however, the temperature of the furnace may be controlled by manual means. Because the temperature in housing 3 must be carefully controlled, the amount of electrical energy applied to the furnace is regulated principally by the temperature at this point.

Sufficient pressure is provided by blower 25 to enable the hot gas or mixture of hot gases to force the incoming charge of limestone above windbox 28 through the tubes of the kiln or reactor. To enable a uniform pressure to be exerted upon the gas or mixture of gases, a series of tuyeres 47 extend through the housing 3 inwardly of windbox 28 and each is provided with a cap 48 to minimize the amount of limestone that may flow back through the tuyeres when the gas pressure is terminated.

The blower may be adjusted to discharge the hot gases at a pressure of approximately 10 to 35 pounds per square inch depending upon the specific gravity of the limestone and the extent to which it is compressed in housing 3. The gas pressure used should be sufficient to force the finely divided limestone upwardly through the tubes in steps arranged at approximately 45° angles to each other and to furnish the differential pressure required to maintain a complete circulation of the gas or gases. The conical base of the kiln will remain relatively full of limestone and by integrating the rate of flow of the limestone and the pressure of the hot gas or gases, a "Jacob's Ladder" effect is obtained in which the limestone is forced upwardly through the tubes in a step by step fashion at an angle of approximately 45° to a horizontal plane passing through the tubes as shown in FIGS. 3, 4 and 5 of the drawings. As shown in FIG. 10, the turbine 32 which drives the blower is connected through a conductor 49 to the gas pressure control 50 which may be manually or automatically set to provide sufficient fuel to the turbine to provide the desired pressure. When the limestone is in such a finely divided state that approximately 20% is minus 100 mesh, 30% is plus 200 mesh, and 50% is minus 325 mesh, a pressure of approximately 35 pounds per square inch is required to provide a "Jacob's Ladder" effect in the tubes of the kiln or reactor. By means of the regulated hot gas or gases which control the rate of flow, the limestone takes on a gurgitating action passing from one side of each of the tubes to the other and ascending at an angle of approximately 45° to a horizontal plane through each of the tubes. The ascending plane of the finely divided limestone permits an effective action of the hot gas or gases upon the limestone and minimizes agglomeration of the limestone and its accretion to the inner walls of the tubes. To provide the "Jacob Ladder" effect, the buoyant effect of the gas and the aerodynamic drag on the limestone particles and the lime formed therefrom must be just sufficient to overcome the force of gravity on the limestone particles and the lime formed therefrom.

During the passage of the limestone through the tubes, it is calcined into lime and carbon dioxide and when carbon monoxide gas is used, it combines with any oxygen or moisture that is present in the charge or which leaks into the system and is to a large extent converted into carbon dioxide. The length of the tubes will of course depend upon the fineness of the limestone particles. As shown in the drawings, they are elongated in shape and are of sufficient length so that all or substantially all of the limestone will be converted into lime and carbon dioxide during the passage of the charge through the tubes.

The lime and the hot carbon dioxide and any carbon monoxide that may remain in the gas, or any moisture that has been converted into hydrogen and carbon dioxide, pass from the kiln through conduit means 6, one end of which is connected to the kiln or reactor and the other end of which is connected to primary separator 7 which has a baffle 51 arranged centrally therein and terminates in an inverted conically-shaped portion 52 which is connected to screw conveyor 8, the screw of which is driven by a motor to a position in which the lime passes through the conduit means 54 to a cooler.

When the hot gas carrying the finely divided lime strikes baffle 51, a predominant portion of the lime falls through the lower portion 52 of the separator into the conveyer 8 and the gas stream which consists predominantly of carbon dioxide passes through a conduit means 55 having one end connected to separator 7 and the opposite end of which extends through an opening in a rectangularly-shaped conduit means 56. The lower portion of conduit means 56 is welded or otherwise secured to conduit means 55 as shown more particularly in FIG. 2 and the portion of conduit means 55 which extends within conduit means 56 is provided with a plurality of steps 57, the front face of each of which has an opening therein. The reversal of the flow of the gas of course retards its speed and additional hot lime in a finely divided state deposits out and falls into a screw conveyer 10, the screw of which is rotated by a motor 59 and the additional lime is passed through a conduit means 60 into conveyer 8 from which it passes through conduit means 54 to the cooler. Any additional fines that may be present are passed into container 61 which terminates in a chute 62 and the gases are passed from container 61 by suitable means, such as a motor driven blower 63 through conduit means 64 back to conduit means 55 and are again passed through the secondary separator. If desired, the container 61 may be provided with a gate 65 so that the fines deposited in container 61 may be recovered.

The gases from separator 9 pass through conduit means 11 to the hearth or furnace 23 where the carbon dioxide may be converted into carbon monoxide for reuse in the lime preparing process. For this purpose, furnace or hearth 23 contains a ferrous metal, such as steel, which as shown is maintained in a molten state by electrical inductive means and means are provided to introduce a carburizing material into the hearth. For this purpose a container 66 is provided having a carburizing material therein which is preferably substantially free from sulphur, such as charcoal, lignite, or peat, and from which a substantial amount of moisture has been removed. For instance, a finely divided carburizing material, such as charcoal, having a moisture content of not more than 3% to 5% may be used. As shown, a container 66 has a reduced lower portion extending over a motor driven belt 67 trained around spaced rollers upon which belt the carburizing material is deposited when a gate 68 hinged to the lower end portion of container 66 is open. As shown in FIGS. 1 and 10, a scale 69 is provided to weigh the carbonaceous material on belt 67 and a tachometer 70 is provided to transmit dual impulses to a controller 71 through a conductor 72 which determines the amount of charcoal that is fed into a hopper 73 leading into a cylinder 74 in which a piston 75 is reciprocated by a motor-driven eccentric 76.

Cylinder 74 is tapered inwardly at its lower end portion and extends into the upper end portion of a tube 77 formed of a refractory material, the lower end portion of which terminates within the furnace in a bell-shaped member 78 which rests upon equally spaced supports extending inwardly from the wall of the furnace. A tubular member 79 extending upwardly from the furnace 23 makes a tight engaging fit with cylinder 74 to prevent the entrance of extraneous air into the furnace.

The carburizing material, such as the charcoal, which is introduced into furnace 23 burns to incandescence when it contacts the molten metal and lacking free air generates carbon monoxide gas and deposits liquid carbon on the hot metal bath. Any moisture that is present in the charcoal charge is broken up in the presence of carbon at the high temperature prevailing in the furnace, forming carbon monoxide and free hydrogen, thus:

$$C + H_2O \rightarrow CO + H_2$$

The carbon dioxide formed by the combustion of charcoal comes into immediate contact with incandescent particles of charcoal and is at once resolved into carbon monoxide by the carbon transfer, thus:

$$CO_2 \rightarrow C + 2CO$$

The fact that hydrogen occurs in gases being generated in the hearth or furnace 23 seems to indicate that the hydrogen does not perform reduction in the process. However, while the hydrogen may not reduce the carbon dioxide directly, it probably assists in reducing it by diluting the carbon dioxide or even by decomposing it, producing carbon monoxide, thus:

$$H + CO_2 \rightarrow H_2O + CO$$

The hot charcoal would of course react with the water thus formed to form carbon monoxide and hydrogen.

The hot carbon dioxide which is converted into a gas consisting predominantly of carbon monoxide is of course passed through conduit means 24 for reuse in the process. A sampling device 80 is arranged in the gas outlet of hearth 23 which is connected by an electrical conductor 81 to an indicating recorder 82 which shows the amount of gas flowing from hearth 23.

As previously stated, while it is preferable to utilize a hot reducing gas, such as carbon monoxide, to force the limestone upwardly through the tubes of the kiln or reactor and to convert it into lime and carbon dioxide, this is not essential because if desired natural gas may be cracked in the presence of oxygen to heat a neutral gas, such as air, which may be utilized for this purpose in which case the hot carbon dioxide gas formed during the process may be exhausted to the atmosphere or may be utilized to preheat the air which is utilized in the process. This form of my invention is shown in FIG. 8 in which the essential parts of the system are similar to those shown in FIG. 1 and have been designated by the same reference numerals. Because air is not inflammable, however, blower 25 is driven by a motor, not shown, and the carbon dioxide which passes through conduit means 11 is used to preheat the air used in the system.

As shown in FIG. 8, the exit conduit means 11 first extends downwardly and then horizontally and upwardly and is provided with a cap 83 which may be secured to its upper end by straps 84 between which the carbon dioxide passes to the atmosphere and surrounding the upwardly extending portion of conduit means 11 and in spaced relation thereto is a casing 85, the upper and lower ends of which are secured to conduit means 11 to provide an air chamber 86 and air is passed into the upper portion of the chamber 86 through a conduit means 87a connected to casing 85 and passes downwardly in heat exchange relation with the ascending carbon dioxide and then passes outwardly from chamber 86 through a conduit means 87 which communicates with a pebble heater 88. The pebble heater is lined with a refractory material capable of resisting high heat and contains pebbles or small cylinders 89 formed of an aluminate, such as calcium aluminate, and having dimensions approximately one inch square and during the passage of the air through the pebble heater, it is heated by a fuel consisting of a mixture of hydrocarbon gas, such as natural gas, and oxygen which is passed into a burner 90 extending through a wall of the heater. As shown, the burner extends downwardly through the top of the heater. Conduit means 24 leads from the heater to the bottom portion of the kiln or reactor and air is passed through the aluminate pebbles or squares. The pebbles act as a catalyst carrier upon which the natural gas is cracked in the presence of oxygen to form carbon monoxide and a small proportion of carbon dioxide and the exothermic reaction which takes place raises the temperature of the resulting mixture of gases to between approximately 3200° and 3600° Fahrenheit at which temperature it passes into the kiln or reactor 1 and then through tube 26 and the mixture of gases enters the windbox 28 at a temperature of approximately 2100° Fahrenheit and gives up to the ascending limestone particles approximately 300° Fahrenheit so that the gases ascend through the tubes at a temperature of approximately 1822° to 1850° Fahrenheit at which temperatures it converts the limestone into lime and carbon dioxide. As shown, the hot gases from the heater first pass into the kiln or reactor and in a circuitous passage around the tubes and through conduit means 26 to blower 25 and from blower 25 through conduit means 27 into windbox 28. The finely divided lime produced is of course separated from the carbon dioxide gas in the same manner as described with respect to FIG. 1.

The temperature of the gas within any part of the system may of course be determined by thermocouples T-1 to T-9 which are or may be connected to a control recorder for adjusting the amount of fuel supplied to burner 90, it being of course understood that the temperature of the gas ascending within the tubes must be controlled within rather narrow limits. The electrical energy supplied to the motor for driving the blower may also be manually or automatically regulated so that the limestone will be forced upwardly through the tube at the desired pressure to provide a "Jacob's Ladder" effect, and the amount of finely divided limestone which is forced into housing 3 may be regulated by manual means or by automatic recorders 43 and 44.

What I claim is:
1. In the process of preparing lime, the steps which comprise feeding limestone in a finely divided state of approximately minus 200 mesh or finer into the lower housing of a vertical reactor having a plurality of externally heated elongated tubes, each composed of a material capable of resisting a temperature above the sintering temperature of lime and being of a diameter of approximately four to six inches communicating with the lower housing and extending upwardly therefrom and enclosed in an upper housing of the reactor with the open end of each tube communicating with conduit means leading from the upper end of the reactor, and passing a hot gas through the limestone particles in said housing to force the limestone particles upwardly through each of said tubes at such pressure that the buoyant force of the gas and the aerodynamic drag upon the limestone particles and the lime formed therefrom are just sufficient to overcome the force of gravity thereon to thereby cause the limestone and the lime formed therefrom to pass from one side to the other side of each of the tubes as it ascends through each tube and said gas being at such temperature and said tubes being of such length that the gas will convert a predominant amount of the limestone into lime and carbon dioxide during the passage of the limestone and lime converted therefrom through the tubes but at a temperature insufficient to sinter a substantial amount of the lime.

2. The process as defined in claim 1 in which the hot gas is composed essentially of a mixture of carbon monoxide and carbon dioxide.

3. In the process of preparing lime, the steps which comprise feeding limestone in a finely divided state of approximately minus 200 mesh or finer into the lower housing of a reactor having a plurality of elongated tubes extending upwardly therefrom and through an upper housing of the reactor, each of which tubes has an upper open end and a diameter of approximately four to six inches and being capable of resisting a temperature above the sintering temperature of lime, while passing a gas at a temperature above the sintering temperature of lime in a circuitous path through the upper housing of the reactor to preheat the tubes and from the upper housing of the reactor to the lower housing, and finally passing the gas upwardly through said tubes at such pressure that the buoyant force of the gas and the aerodynamic drag upon the limestone and lime particles formed therefrom is just sufficient to overcome the force of gravity thereon to thereby cause the limestone particles and the lime formed therefrom to pass from one side to the other side of each of the tubes as it ascends through each tube and said gas being at such temperature and said tubes being of such length that the gas will convert a predominant amount of the limestone into lime and carbon dioxide during the passage of the limestone and lime through the tubes but at a temperature insufficient to sinter a substantial amount of the lime.

4. In the process of preparing lime, the steps which comprise continuously feeding limestone in a finely divided state of approximately minus 200 mesh or finer into the lower housing of a reactor having a plurality of elongated tubes extending upwardly therefrom and through an upper housing of the reactor, each of which tubes has an upper open end and a diameter of approximately four to six inches and each tube being capable of resisting a temperature above the sintering temperature of lime while continuously passing a gas at a temperature above the sintering temperature of lime through the upper housing of the reactor in a circuitous pass around the tubes to preheat the tubes and from the upper housing to the lower housing and then continuously passing the gas into the lower housing of the reactor and upwardly through the tubes at approximately the calcining temperature of the lime and at such pressure that the buoyant force of the gas and the aerodynamic drag upon the limestone particles and the lime formed therefrom are just sufficient to overcome the force of gravity thereon to thereby force the limestone and the lime formed therefrom upwardly through the tubes in a step by step fashion and said gas being at such temperature that during the passage of the gas and the limestone and lime formed therefrom through the tubes a predominant amount of limestone will be converted into lime and carbon dioxide but said gas being at a temperature insufficient to sinter a substantial amount of the lime.

5. The process as defined in claim 4 in which the gas is composed essentially of carbon monoxide and carbon dioxide.

6. In the process of preparing lime as defined in claim 4 including the steps of separating the lime from the mixture of lime and hot gas consisting predominantly of carbon dioxide which exude from the open end of the tubes, passing the hot gas in heat exchange relation with air, and then passing the air through a pebble heater having a burner extending therein through which a fuel consisting of natural gas and oxygen is fed to heat the air and to provide a mixture of hot gases for use in the process.

7. The process of continuously preparing lime which comprises continuously feeding limestone in a finely divided state of approximately minus 200 mesh or finer into the lower housing of a reactor having a plurality of elongated tubes extending upwardly therefrom and through an upper housing of the reactor, each of which tubes has an upper open end and a diameter of approximately four to six inches and each tube being capable of resisting a temperature above the sintering temperature of lime while continuously passing carbon monoxide gas having a temperature above the sintering temperature of lime in a circuitous path around the exterior surface of the tubes in the upper housing of the reactor to preheat the tubes and then through conduit means exposed to the atmosphere which leads from the upper housing of the reactor to the lower housing, passing the carbon monoxide gas at approximately the calcining temperature of the limestone into the lower housing to force the limestone particles and the lime formed therefrom upwardly through each of the tubes at such pressure that the buoyant effect of the carbon monoxide gas and the aerodynamic drag upon the limestone particles and the lime formed therefrom is just sufficient to overcome their gravity to thereby cause the limestone particles and the lime formed therefrom to pass from one side to the other side of each of the tubes as it ascends through each tube, and said tubes being of sufficient length and the carbon monoxide gas being at such temperature as it ascends upwardly through the tubes that it will convert a predominant amount of the limestone into lime and carbon dioxide but at a temperature insufficient to sinter a substantial amount of the lime, and then separating the lime from the hot gas consisting predominantly of carbon dioxide that is formed during the process.

8. The process of continuously preparing lime which comprises continuously feeding limestone in a finely divided state of approximately minus 200 mesh or finer into the lower housing of a reactor having a plurality of elongated tubes extending upwardly therefrom and through an upper housing of the reactor, each of which tubes has an upper open end and a diameter of approximately four to six inches and each tube being capable of resisting a temperature above the sintering temperature of lime while continuously passing carbon monoxide having a temperature above the sintering temperature of lime in a circuitous path around the exterior surface of the tubes in the upper housing of the reactor to preheat the tubes and then through conduit means exposed to the atmosphere which leads from the upper housing of the reactor to the lower housing, passing the carbon monoxide gas at approximately the calcining temperature of the limestone into the lower housing to force the limestone particles and the lime formed therefrom upwardly through each of the tubes at such pressure that the buoyant effect of the carbon monoxide and the aerodynamic drag on the limestone particles and the lime formed therefrom is just sufficient to overcome their gravity to thereby cause the limestone particles and the lime formed therefrom to pass from one side to the other side of each of the tubes as it ascends through each tube, and said tubes being of sufficient length and the carbon monoxide gas being at such temperature as it ascends upwardly through the tubes that it will convert a predominant amount of the limestone into lime and carbon dioxide but at a temperature insufficient to sinter a substantial amount of the lime, separating the lime from the gas which issues from the upper end of said tubes and subjecting the gas to a hot carburizing material to reduce at least a substantial portion of the carbon dioxide gas to a carbon monoxide gas, and then reutilizing the gas in the process.

9. A closed system for preparing lime from finely divided limestone of approximately minus 200 mesh or finer including a reactor having an upper housing with an inlet opening at its lower end portion and an outlet opening at its upper end portion, a lower housing containing finely limestone and having a series of inlet openings arranged therein, means for continuously feeding the limestone particles of the size mentioned into the lower housing, upper and lower headers arranged in said reactor, each having openings therein, first outlet conduit means leading from the upper header and said lower header being arranged between and separating the lower housing from the upper housing, a plurality of elongated tubes capable of resisting a temperature above the sintering temperature of lime and each having a diameter approximating four to six inches arranged in the upper housing of said reactor, the lower end of each of which tubes is supported in the lower header and communicates through an opening therein with the lower housing and the upper end of each of which tubes is supported by the upper header and communicates through an opening therein with the first outlet conduit means, a plurality of baffles in the upper housing arranged in staggered relation to each other, a second conduit means exposed to the atmosphere leading from the outlet opening in the upper housing of the reactor to the openings in the lower housing, means for drawing carbon monoxide at a temperature above the sintering temperature of lime into the inlet opening of the upper housing of said reactor and in a circuitous path around said baffles at a temperature above the sintering temperature of lime to externally heat said tubes and then through said second outlet conduit means and forcing it into the openings of the lower housing through the limestone particles in the lower housing and upwardly through said tubes at such pressure that the buoyancy of the carbon monoxide gas and the aerodynamic drag on the limestone particles and the lime formed therefrom is just sufficient to overcome their gravity to thereby cause the limestone particles and the lime formed therefrom to pass from one side of each tube to the other side thereof as the carbon monoxide gas, the limestone particles and the lime ascend through the tubes, and said carbon monoxide gas being at such temperature and said tubes being of such length that a predominant amount of the limestone is converted into lime and carbon dioxide as the charge is passed through said tubes, a hearth containing a molten metal, a separator communicating with the first conduit means for separating the lime from the carbon dioxide, a third conduit means connected to and leading from said separator to said hearth through which carbon dioxide from the first conduit means is passed, means which is substantially closed to the atmosphere for introducing a carburizing material into said hearth, and conduit means leading from said hearth to the lower portion of the upper housing of said reactor through which the carbon monoxide gas may be drawn from said hearth into said reactor.

10. A closed system for preparing lime from finely divided limestone of approximately minus 200 mesh or finer including a reactor having an upper housing with an inlet opening at its lower end portion and an outlet opening at its upper end portion, a lower housing containing the finely divided limestone and having a series of inlet openings arranged therein, means for continuously feeding limestone particles of the size mentioned into the lower housing, upper and lower headers arranged in said reactor, each having openings therein, first outlet conduit means leading from the upper header and said lower header being arranged between and separating the lower housing from the upper housing, a plurality of elongated tubes capable of resisting a temperature above the sintering temperature of lime and each of said tubes having a diameter approximating four to six inches arranged in the upper housing of said reactor, the lower end of each of which is supported by the lower header and communicates through an opening therein with the lower housing and the upper end of each of which is supported by the upper header and communicates through an opening therein with the first outlet conduit means, baffles in the upper housing arranged in staggered relation to each other, a second conduit means exposed to the atmosphere leading from the outlet opening in the upper housing of the reactor to the openings in the lower housing of the reactor, turbine operated means for drawing carbon monoxide gas at a temperature above the sintering temperature of lime into the upper housing of said reactor through its inlet opening and in a circuitous path around said baffles at a temperature above the sintering temperature of lime to externally heat said tubes and through said second outlet conduit means and forcing it into the openings of the lower housing through the limestone particles therein and upwardly through said tubes at such pressure that the buoyancy of the carbon monoxide gas and the aerodynamic drag on the limestone particles and the lime formed therefrom is just sufficient to overcome their gravity to thereby cause the limestone particles and the lime formed therefrom to pass from one side of each tube to the other side thereof as the charge consisting of the limestone particles, the lime and the carbon monoxide gas ascend through the tubes and said carbon monoxide being at such temperature and said tubes being of such length that a predominant amount of the limestone is converted into lime and carbon dioxide as the charge is passed through said tubes, a hearth containing molten metal, means connected to the first conduit means for separating the lime from the carbon dioxide, a third conduit means connected and leading from said separator to said hearth through which carbon dioxide from the first conduit means is passed, means which is substantially closed to the atmosphere for introducing a carburizing material into said hearth, a fourth conduit means leading from said hearth to the lower portion of the upper housing of said reactor through which the carbon monoxide gas may be drawn into the reactor and fifth conduit means for diverting a portion of the carbon monoxide gas to said turbine from the fourth conduit means to provide fuel for use in combination with oxygen for driving said turbine.

11. A system for preparing lime from finely divided limestone of approximately minus 200 mesh or finer including a reactor comprising an upper housing having an inlet opening at its lower end portion and an outlet opening at its upper end portion, a lower housing having a plurality of inlet openings therein, means for continuously feeding limestone particles of the size mentioned into the lower housing, upper and lower headers, each having a plurality of openings therein arranged in said reactor, a first conduit means leading from the upper header, a plurality of elongated tubes capable of resisting temperatures above the sintering temperature lime and each having a diameter approximately four to six inches arranged in the upper housing of said reactor, each of which tubes is supported by the lower header and communicates with the lower housing through an opening therein and the upper end of each of which tubes is supported by the upper header and communicates with the first outlet conduit means through an opening in the upper header, a plurality of staggered baffles arranged in the upper housing, a second conduit means leading from the outlet opening in the upper housing to the openings in the lower housing, means for feeding limestone of the size mentioned into the lower housing of the reactor, means for drawing a gas which is at a temperature above the sintering temperature of lime into the upper housing through the inlet opening therein and in a circuitous path around the baffles to externally heat said tubes and through the second conduit means to force the hot gas through the openings in the lower housing of the reactor and the limestone particles and upwardly through each of the tubes at such pressure that the buoyancy of the gas and the aerodynamic drag on the limestone particles and the lime formed therefrom is just sufficient to overcome their gravity to thereby cause the limestone particles and the lime formed therefrom to pass from one side of each tube to the other side thereof as the limestone particles and the lime formed therefrom ascends through the tubes and the tubes being of such length and the carbon monoxide gas being maintained at such temperature that a predominant amount of the limestone is converted into lime and carbon dioxide during its passage through said tubes but at a temperature insufficient to sinter a substantial amount of the lime, a separator connected to the first conduit means for separating the lime from the carbon dioxide, a third conduit means leading from said separator to the atmosphere, means associated with the third conduit means whereby air may be passed in heat exchange relation with the carbon dioxide as it passes to the atmosphere, a heater connected to said heat exchange means, means for applying a fuel to said heater including a mixture of natural gas and oxygen, and conduit means leading from the heater to the inlet conduit means at the lower end portion of the upper housing of said reactor.

References Cited by the Examiner
UNITED STATES PATENTS

| | | | |
|---|---|---|---|
| 295,125 | 3/1884 | Luckenbach | 1263—21 X |
| 2,014,764 | 9/1935 | Gram | 34—10 |
| 2,763,478 | 9/1956 | Parry | 263—21 |
| 2,776,132 | 1/1957 | Pyzel | 263—53 |
| 2,782,019 | 2/1957 | Turney et al. | 34—57 X |
| 2,903,800 | 9/1959 | Skoglund | 34—57 X |

MEYER PERLIN, *Primary Examiner.*

JOHN J. CAMBY, CHARLES SUKALO, *Examiners.*

WILLIAM F. O'DEA, A. W. DAVIS,
*Assistant Examiners.*